(12) United States Patent
Dalessio et al.

(10) Patent No.: US 11,156,298 B2
(45) Date of Patent: Oct. 26, 2021

(54) FRONT-LOADING VALVE ASSEMBLY FOR MANIFOLD FOR PROCESSING FLUID SAMPLE

(71) Applicant: Pall Corporation, Port Washington, NY (US)

(72) Inventors: Daniel J. Dalessio, Walpole, MA (US); Mary P. Vail, Woburn, MA (US)

(73) Assignee: Pall Corporation, Port Washington, NY (US)

( * ) Notice: Subject to any disclaimer, the term of this patent is extended or adjusted under 35 U.S.C. 154(b) by 0 days.

(21) Appl. No.: 15/234,811

(22) Filed: Aug. 11, 2016

(65) Prior Publication Data

US 2018/0045322 A1  Feb. 15, 2018

(51) Int. Cl.
*F16K 5/08* (2006.01)
*F16K 27/06* (2006.01)
(Continued)

(52) U.S. Cl.
CPC .............. *F16K 5/08* (2013.01); *B01L 3/567* (2013.01); *F16K 5/0407* (2013.01);
(Continued)

(58) Field of Classification Search
CPC ........ F16K 5/08; F16K 5/0407; F16K 5/0442; F16K 27/065; F16K 27/003;
(Continued)

(56) References Cited

U.S. PATENT DOCUMENTS

| 704,522 A | * | 7/1902 | Douglas | F16K 5/0414 |
| | | | | 251/184 |
| 2,031,121 A | * | 2/1936 | Mueller | F16K 5/08 |
| | | | | 251/312 |

(Continued)

FOREIGN PATENT DOCUMENTS

| DE | 1600847 A1 | 4/1970 |
| FR | 1350042 A | 1/1964 |

(Continued)

OTHER PUBLICATIONS

"EZ-Fit Manifold," Website, EMD Millipore, United States, Apr. 14, 2016.

(Continued)

*Primary Examiner* — Umashankar Venkatesan
*Assistant Examiner* — Andrew J Rost
(74) *Attorney, Agent, or Firm* — Leydig, Voit & Mayer, Ltd.

(57) ABSTRACT

A valve assembly used in a manifold system fix processing fluid samples includes a body, a valve member, and a coupling assembly. The body defines a fluid passage and a valve passage in communication with the fluid passage and receiving at least a portion of the valve member therein. The valve member is selectively movable over a range of travel between an open position, in which fluid can flow through the fluid passage, and a closed position, in which the valve member occludes the fluid passage. The coupling assembly includes a coupling member and a retention lug. The retention lug is connected to one of the body and the coupling (Continued)

member. The other of the body and the coupling member defines a lug raceway configured to removably receive the retention lug therein to removably mount the coupling member to the body with the valve member being movably retained therebetween.

14 Claims, 14 Drawing Sheets

(51) Int. Cl.
| | | |
|---|---|---|
| *B01L 3/00* | (2006.01) | |
| *F16K 27/00* | (2006.01) | |
| *F16K 31/528* | (2006.01) | |
| *F16K 5/04* | (2006.01) | |
| *F16K 11/22* | (2006.01) | |

(52) U.S. Cl.
CPC ............ *F16K 5/0442* (2013.01); *F16K 11/22* (2013.01); *F16K 27/003* (2013.01); *F16K 27/065* (2013.01); *F16K 31/5284* (2013.01)

(58) Field of Classification Search
CPC ...... F16K 31/5284; F16K 11/22; F16K 5/045; F16K 5/0492; F16K 27/06; F16K 5/04; B01L 3/567; G01N 1/34; G01N 1/36
USPC ....... 251/312, 286–288, 309, 292, 291, 148; 251/180, 181, 184
See application file for complete search history.

(56) References Cited

U.S. PATENT DOCUMENTS

| | | | | |
|---|---|---|---|---|
| 2,047,714 | A * | 7/1936 | Smith | F16L 33/16 |
| | | | | 285/148.14 |
| 2,627,417 | A * | 2/1953 | Mueller | F16K 5/0214 |
| | | | | 137/599.05 |
| 2,980,390 | A * | 4/1961 | Anderson | F16K 5/0285 |
| | | | | 251/181 |
| 3,133,723 | A * | 5/1964 | Goldman | F16K 5/0478 |
| | | | | 251/309 |
| 3,168,280 | A * | 2/1965 | Mueller | F16K 5/0478 |
| | | | | 251/217 |
| 4,262,880 | A * | 4/1981 | Danko | F16K 5/0407 |
| | | | | 251/209 |
| 4,314,581 | A * | 2/1982 | Schrock | F16K 5/045 |
| | | | | 137/454.5 |
| 4,711,268 | A | 12/1987 | Coleman | |
| 4,909,545 | A * | 3/1990 | Hohol | F16L 37/248 |
| | | | | 285/148.13 |
| 4,930,538 | A | 6/1990 | Browne | |
| 4,988,077 | A * | 1/1991 | Conley | F16K 5/045 |
| | | | | 251/309 |
| 5,149,054 | A * | 9/1992 | Passerell | F16K 5/045 |
| | | | | 251/309 |
| 5,234,193 | A * | 8/1993 | Neal, Jr. | F16K 27/065 |
| | | | | 251/175 |
| 5,529,694 | A * | 6/1996 | Strickler | B01D 11/0219 |
| | | | | 210/416.1 |
| 5,653,259 | A | 8/1997 | Ramstad | |
| 5,704,590 | A * | 1/1998 | Pfeiffer | F16K 5/04 |
| | | | | 251/309 |
| 8,726,935 | B2 | 5/2014 | Leys | |
| 8,863,594 | B2 | 10/2014 | Taylor et al. | |
| 2005/0077730 | A1* | 4/2005 | Thut | F16L 37/248 |
| | | | | 285/401 |

FOREIGN PATENT DOCUMENTS

| | | |
|---|---|---|
| JP | S49139626 | 12/1974 |
| JP | 3023631 Z | 4/1996 |
| JP | 2000-310344 A | 4/2002 |
| TW | 506969 B | 10/2002 |
| WO | WO 2011/106384 A1 | 9/2011 |
| WO | WO 2014/194974 A1 | 12/2014 |

OTHER PUBLICATIONS

"Vacuum Manifolds for MicroFunnel™ Filter Funnel," Pall Life Sciences, United States, Apr. 2008.
"Aluminum Filter Funnel Manifolds," Pall Life Sciences, United States, May 2008.
"EZ-Fit™ Manifold for universal laboratory filtration," Merck Millipore, Germany, Nov. 2012.
"Filter Funnel Manifold, Polyurethane," Pall Life Sciences, United States, Apr. 2014.
"Ensure Contamination Control," Pall Life Sciences, United States, Nov. 2009.
Intellectual Property Office of Singapore, Search Report in counterpart Singapore Application No. 10201706547P, dated Apr. 9, 2018.
Japanese Patent Office, Notice of Reasons for Rejection in counterpart Japanese Application No. 2017-151750, dated Jul. 3, 2018.
European Patent Office, Extended European Search Report in counterpart European Application No. 17185577.8, dated Jan. 3, 2018.
State Intellectual Property Office of the People's Republic of China, Notification of the First Office Action in counterpart Chinese Application No. 201710682890.2, dated Oct. 31, 2018.
Canadian Intellectual Property Office, Office Action in counterpart Canadian Application No. 2075832, dated Oct. 3, 2018.
Japanese Patent Office, Notice of Reasons for Rejection in counterpart Japanese Application No. 2017-151750, dated Feb. 19, 2019.
Canadian Intellectual Property Office, Office Action in counterpart Canadian Application No. 2975832, dated Jul. 16, 2019.
State Intellectual Property Office of the People's Republic of China, Notification of the Second Office Action in counterpart Chinese Application No. 201710682890.2, dated Jul. 3, 2019.
European Patent Office, Article 94(3) EPC Communication in counterpart European Application No. 17185577.8, dated Jul. 2, 2019.

* cited by examiner

FRONT-LOADING VALVE ASSEMBLY FOR MANIFOLD FOR PROCESSING FLUID SAMPLE

TECHNICAL FIELD

This patent disclosure relates generally to a valve assembly for a manifold and, more particularly, to a front-loading valve assembly fir a manifold suitable for processing a fluid sample.

BACKGROUND

Conventional microbiological manifolds use a valve to control the vacuum (therefore the flow) that pulls a liquid sample through a membrane when processing the sample. A typical valve is constructed to pass completely through a passage in a body mounted to the manifold such that a rear portion of the valve projects from the body. This rearward-projecting portion is used to hold the valve in place via a clamping device on the back side of the manifold, This arrangement can increase the risk of contamination (and consequently, false test results).

If the clamp is not installed correctly, the sample processing can malfunction. In order to confirm that the clamp is correctly arranged, an operator must examine the rear of the manifold to visually verify the proper installation of the clamp. Accordingly, an operator may fail to notice that a clamp is not properly installed when conducting a test because the operator failed to inspect the rear of the manifold. Furthermore, the second opening through which the tail end of the valve projects for the clamping device can present an additional site for biofilm build up and contamination.

U.S. Pat. No. 8,863,594 is entitled, "Sample Container and Filtration Apparatus and Method of Filtration Using Same," The '594 patent is directed to a sample container and filtration apparatus that includes a sample container portion with an interior volume and a fluid path passing through a bottom wall. The sample container may also include a valve casing connected to and moveable relative to the sample collection portion between a first and second position. A valve secured to and moveable with the valve casing may close the fluid path of the sample collection portion when in a first position and open the fluid path when in a second position. The apparatus may also include a vacuum base coupling portion that is distal to the valve casing and a filter membrane support surface for supporting a filter membrane.

Gate valves generally include a straight-line flow path extending through opposing ends, and a gate that is lifted in and out of the straight-line flow path to permit or prevent the flow of liquids along the flow path. Globe valves generally include a straight-line flow path extending through opposing ends, and a movable plug that can be screwed in to close (or shut) the valve. The plug may be connected to a stem which can be screwed into the valve by, e.g., a hand-wheel.

There is a continued need in the art to provide additional solutions to enhance the processing of fluid samples through a manifold. For example, there is a continued need for techniques for processing fluid samples through a manifold in which the proper installation of the constituent components is readily verified. There is also a continued need for systems and methods for processing fluid samples via a manifold that allows for connecting components without the need for a clamping device and that reduces the contamination entry points into the system.

It will be appreciated that this background description has been created by the inventors to aid the reader, and is not to be taken as an indication that any of the indicated problems were themselves appreciated in the art. While the described principles can, in some aspects and embodiments, alleviate the problems inherent in other systems, it will be appreciated that the scope of the protected innovation is defined by the attached claims, and not by the ability of any disclosed feature to solve any specific problem noted herein.

SUMMARY

The present disclosure, in one aspect, is directed to embodiments of a valve assembly used in a manifold system for processing fluid samples. In addition, the present disclosure, in another aspect, is directed to embodiments of a manifold assembly for processing fluid samples.

In one embodiment, a valve assembly for a manifold is described. The valve assembly includes a body, a valve member, and a coupling assembly.

The body defines a fluid passage and a valve passage. The fluid passage extends axially between a first fluid opening and a second fluid opening and includes a cross-bore opening disposed axially between the first and second fluid openings. The valve passage is in communication with the fluid passage via the cross-bore opening of the fluid passage.

At least a portion of the valve member is disposed in the valve passage of the body. The valve member is selectively movable over a range of travel between an open position, in which the first fluid opening and the second fluid opening of the fluid passage of the body are in fluid communication with each other, and a closed position, in which the valve member occludes the fluid passage to fluidly isolate the first fluid opening and the second fluid opening.

The coupling assembly is adapted to removably mount the valve member to the body. The coupling assembly includes a coupling member and a retention lug. The coupling member defines an internal cavity. At least a portion of the valve member is disposed within the internal cavity of the coupling member. The retention lug is connected to one of the body and the coupling member. The other of the body and the coupling member includes a retention surface that defines a lug raceway. The lug raceway is configured to removably receive the retention lug therein such that the retention lug and the retention surface are in interfering relationship with each other to removably mount the coupling member to the body with the valve member being movably retained therebetween.

In another embodiment, a valve assembly for a manifold is described. The valve assembly includes a body, a valve member, and a coupling assembly.

The body is hollow and defines a fluid passage and a valve passage. The valve passage is in communication with the fluid passage.

At least a portion of the valve member is disposed in the blind cross bore of the body. The valve member is selectively movable over a range of travel between an open position, in which the axial through passage permits fluid flow therethrough, and a closed position, in which the valve member occludes the axial through passage. The valve member includes a core and a mounting flange. The mounting flange circumscribes the core and extends radially therefrom.

The coupling assembly is adapted to removably mount the valve member to the body. The coupling assembly includes a coupling member and a biasing member. The coupling member is removably mounted to the body. The coupling member defines an internal cavity. The biasing member and the mounting flange of the valve member are disposed within the internal cavity of the coupling member. The biasing member is interposed between the mounting flange of the valve member and the coupling member when the coupling member is removably mounted to the body such that the biasing member exerts an opposing force against the mounting flange of the valve member and against the coupling member.

In yet another embodiment, a manifold assembly for processing a fluid sample is described. The manifold assembly includes a manifold, a body, a valve member, and a coupling assembly.

The manifold includes a manifold housing defining a main manifold passage and at least one manifold inlet port. Each manifold inlet port is in fluid communication with the main manifold passage. The manifold housing also defines a main manifold passage outlet in fluid communication with the main manifold passage.

The body is connected to one of said at least one manifold inlet port of the manifold housing. The body defines a fluid passage and a valve passage. The fluid passage extends axially between a first fluid opening and a second fluid opening and includes a cross-bore opening disposed axially between the first and second fluid openings. The second fluid opening is in fluid communication with the main manifold passage. The valve passage is in communication with the fluid passage via the cross-bore opening of the fluid passage.

At least a portion of the valve member being disposed in the valve passage of the body. The valve member is selectively movable over a range of travel between an open position, in which the first fluid opening and the second fluid opening of the fluid passage of the body are in fluid communication with each other, and a closed position, in which the valve member occludes the fluid passage to fluidly isolate the first fluid opening and the second fluid opening.

The coupling assembly is adapted to removably mount the valve member to the body. The coupling assembly includes a coupling member and a retention lug. The coupling member defines an internal cavity, At least a portion of the valve member is disposed within the internal cavity of the coupling member. The retention lug is connected to one of the body and the coupling member. The other of the body and the coupling member includes a retention surface that defines a lug raceway. The lug raceway is configured to removably receive the retention lug therein such that the retention lug and the retention surface are in interfering relationship with each other to removably mount the coupling member to the body with the valve member being movably retained therebetween.

Further and alternative aspects and features of the disclosed principles will be appreciated from the following detailed description and the accompanying drawings. As will be appreciated, the valve assemblies and manifold assemblies disclosed herein are capable of being carried out in other and different embodiments, and capable of being modified in various respects. Accordingly, it is to be understood that both the foregoing general description and the following detailed description are exemplary and explanatory only and do not restrict the scope of the appended claims.

Figure 1:
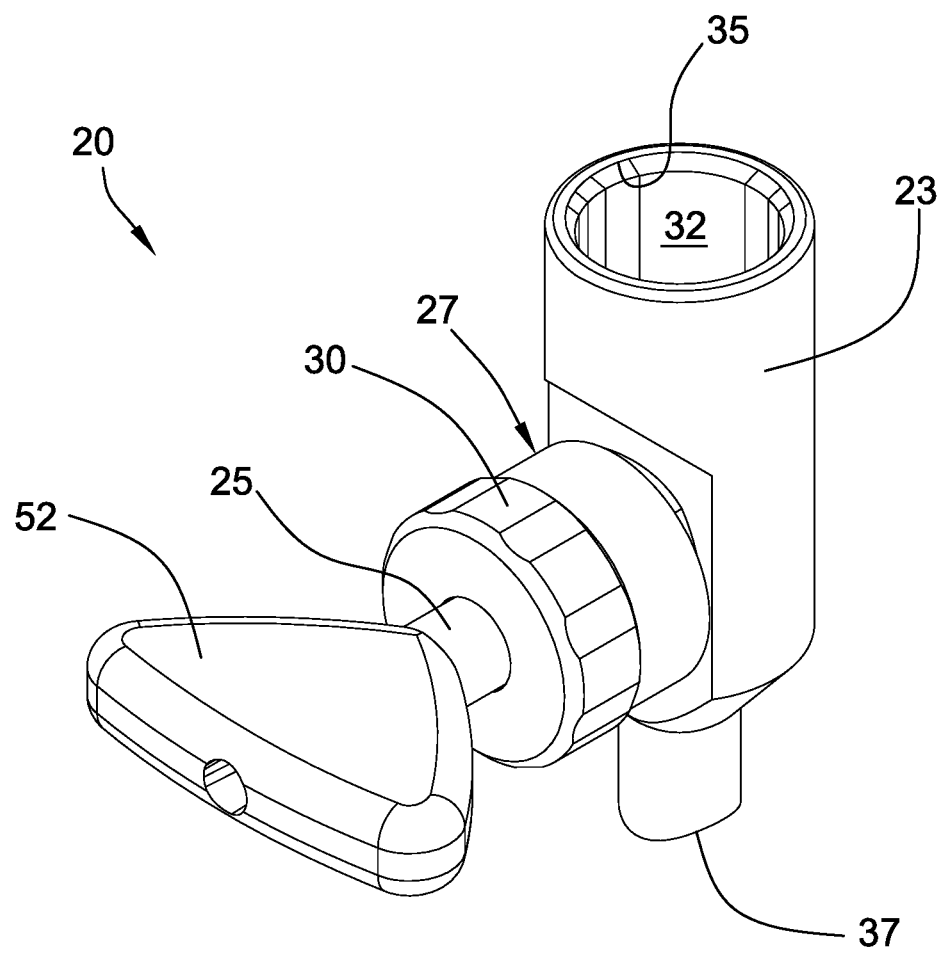
FIG. 1 is a perspective view of an embodiment of a valve assembly constructed in accordance with principles of the present disclosure, illustrating the valve assembly in a closed position.
Figure 2:
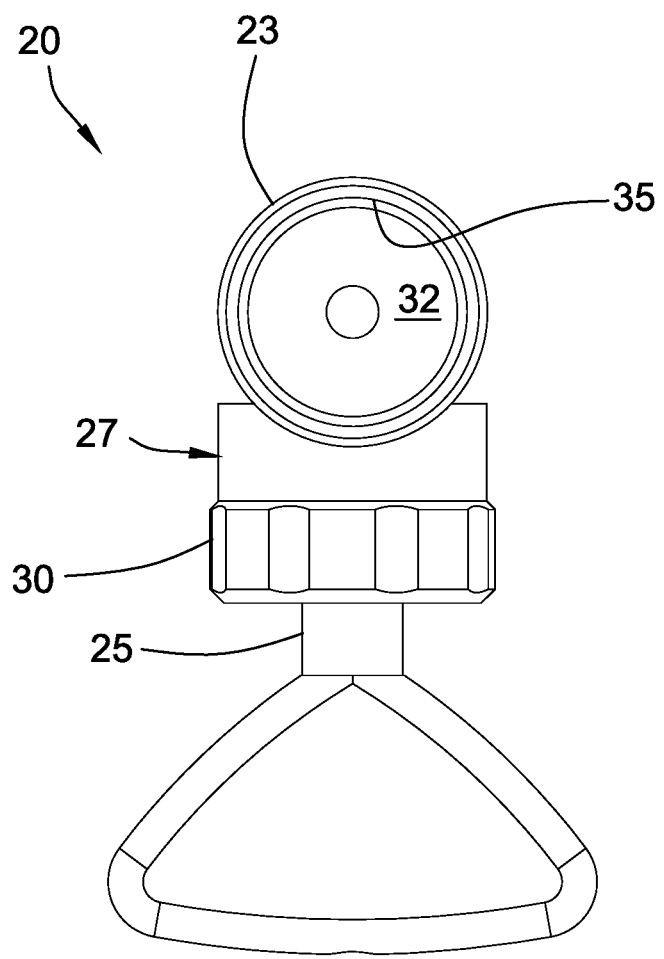
FIG. 2 is a top plan view of the valve assembly of FIG. 1.
Figure 3:
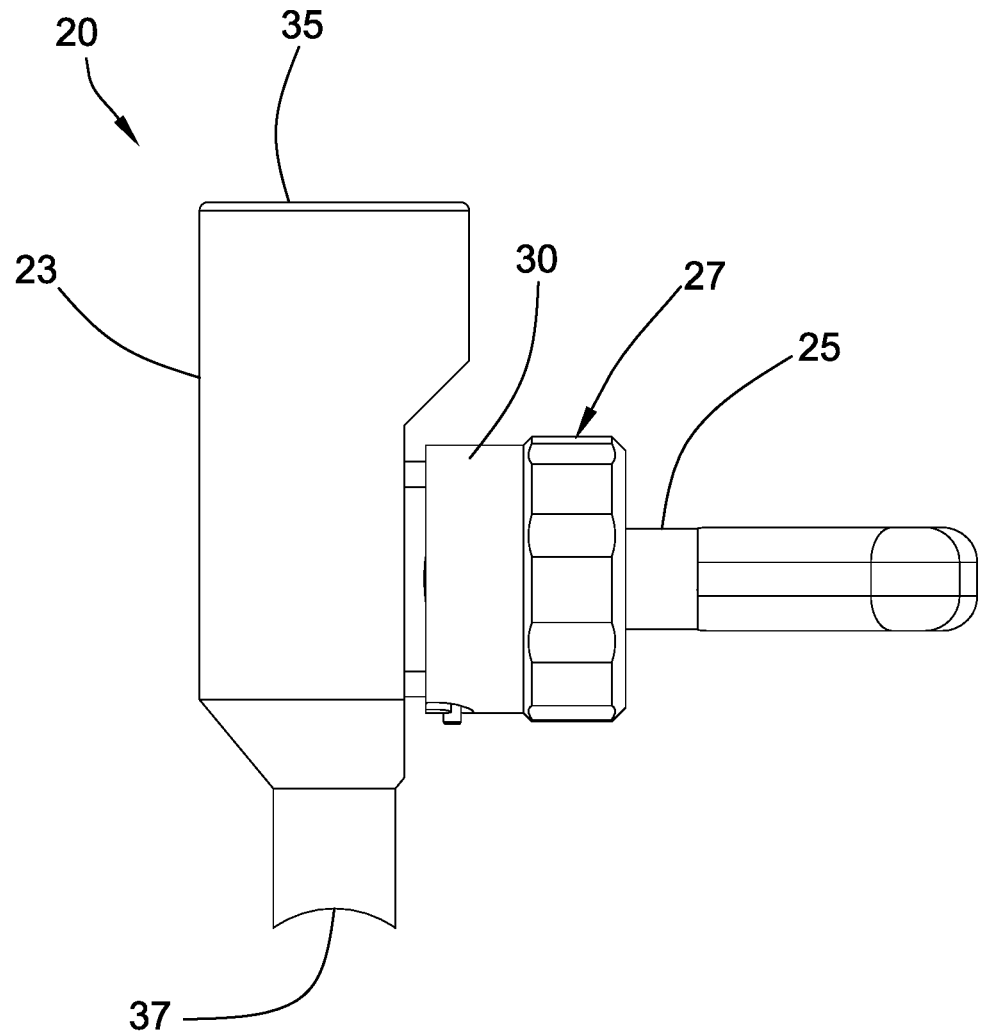
FIG. 3 is a side elevational view of the valve assembly of FIG. 1.

It should be understood that the drawings are not necessarily to scale and that the disclosed embodiments are illustrated diagrammatically and in partial views. In certain instances, details which are not necessary for an understanding of this disclosure or which render other details difficult to perceive may have been omitted. It should be understood that this disclosure is not limited to the particular embodiments illustrated herein.

DETAILED DESCRIPTION OF EXEMPLARY EMBODIMENTS

Embodiments of a valve assembly constructed in accordance with principles of the present disclosure are adapted to be used with a manifold assembly for processing one or more fluid samples. Embodiments of a valve assembly constructed in accordance with principles of the present disclosure can be used with a microbiology manifold, which includes a manifold body having an internal manifold passage and one or more openings communicating with the internal manifold passage.

Embodiments of a valve assembly constructed in accordance with principles of the present disclosure can serve as a filter device holder and provide a fluid path for membrane filtration of liquids though a porous filter medium to recover microorganisms within the liquid sample. Embodiments of a valve assembly constructed in accordance with principles of the present disclosure are configured as a front-loading and -locking valve. Embodiments of a valve assembly constructed in accordance with principles of the present disclosure can be used to selectively control the flow of a fluid sample through a manifold without the need for a rear-mounted clamping device.

In embodiments of a valve assembly constructed in accordance with principles of the present disclosure, the valve assembly can include a valve member in the form of a valve core unit that is removably connected to a body via a coupling assembly. The valve core assembly can be inserted into the front of the valve body via a valve passage. In embodiments, the valve passage comprises a blind cross bore having a single opening in the front of the valve body. At least a portion of the valve core can be disposed within the valve passage when the valve core unit is mounted to the valve body and is operable to selectively occlude a fluid passage defined within the valve body through which a fluid sample can flow into the manifold.

In embodiments, the valve core unit can comprise a readily installed and removed subassembly including a core, a knob connected to the core, a coupling member in the form of a lock collar disposed around the valve core, a biasing member in the form of a spring interposed between the valve core and the lock collar, and a plurality of seal members mounted to the valve core. The valve core, the knob, the lock collar, the spring, and the seal members can be preassembled to form the valve core unit. In embodiments, the lock collar and spring are disposed around an exterior surface of the valve core. The valve core unit can include the knob and a gripping surface disposed on the exterior of the lock collar to facilitate the installation and removal of the valve core unit into and from the body. In use, a worn or spent valve core unit can be replaced with a new valve core unit having a similar construction according to principles of the present disclosure.

In embodiments, a retention lug connected to the body and a raceway in the form of a slot (or bayonet groove) defined in the lock collar form a bayonet mount to lock the valve core unit to the body. The spring can be adapted to provide a force to keep the lock collar and the valve core in place axially when mounted to the body.

The coupling member can be positioned at the front of the body to provide for valve core installation and removal from the front of the manifold. The configuration of the valve body with a single opening for the valve passage reduces the number of potential contamination entry points relative to conventional valve assemblies in which a valve core is inserted completely through a through passage in the body. The valve core unit can be mounted to the body without the use of a clamping mechanism at the rear of the body, thereby also eliminating the need for an operator to reach around to the back of the manifold to complete assembly or to visually verify that the valve core unit is properly installed. As the valve core unit is removable, cleaning and sterilizing the body via autoclaving can be readily performed to help further reduce the risk of sample contamination.

Turning now to the Figures, an embodiment of a valve assembly 20 constructed according to principles of the present disclosure is shown in FIGS. 1-7. The valve assembly 20 is adapted for use in a manifold assembly for processing fluid samples. The valve assembly 20 includes a body 23, a valve member 25, and a coupling assembly 27 having a coupling member 30 in the form of a lock collar.

Figure 6:
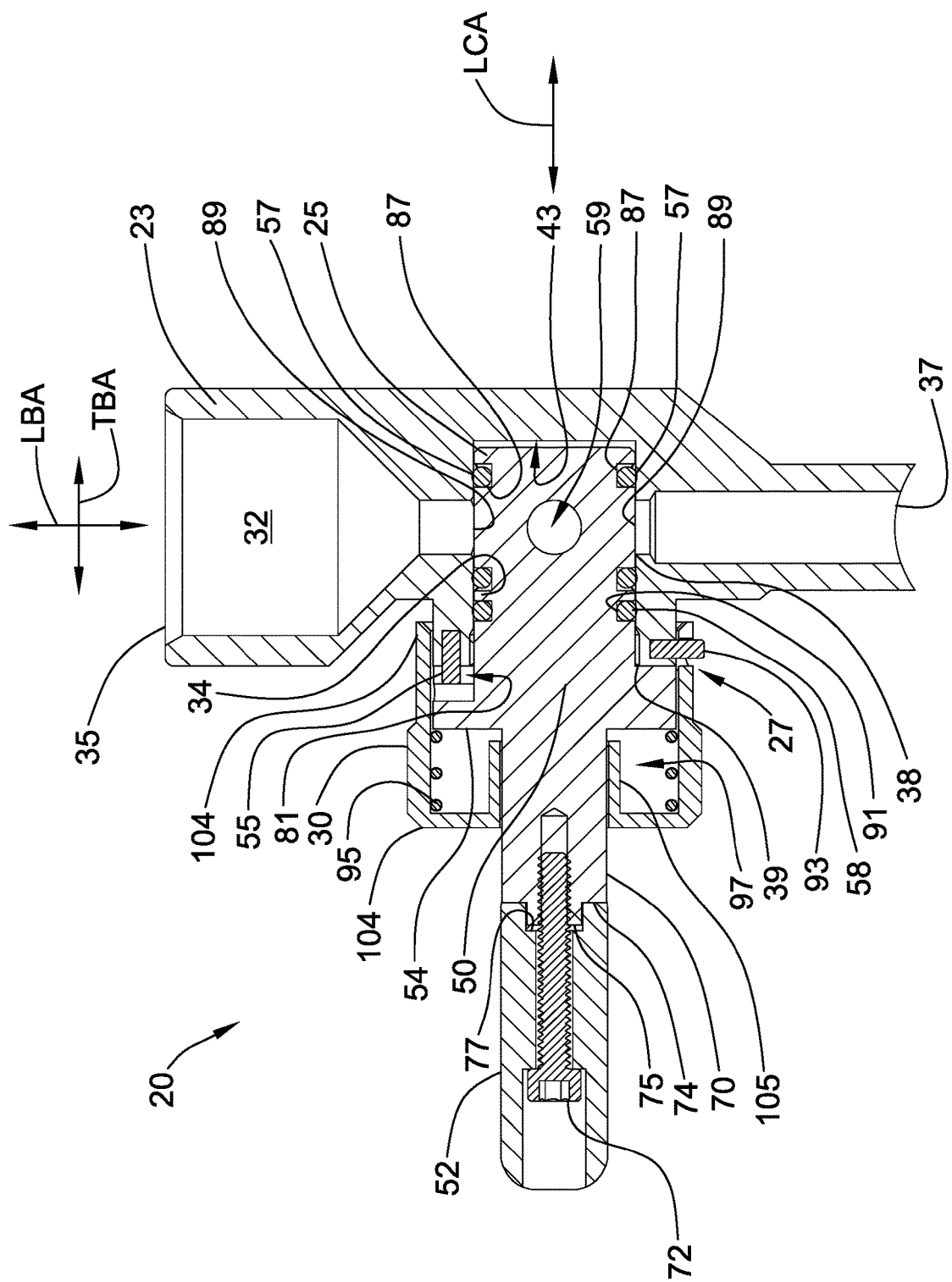
FIG. 6 is a cross-sectional view of the valve assembly of FIG. 1 taken along line VI-VI in FIG. 5.
Figure 7:
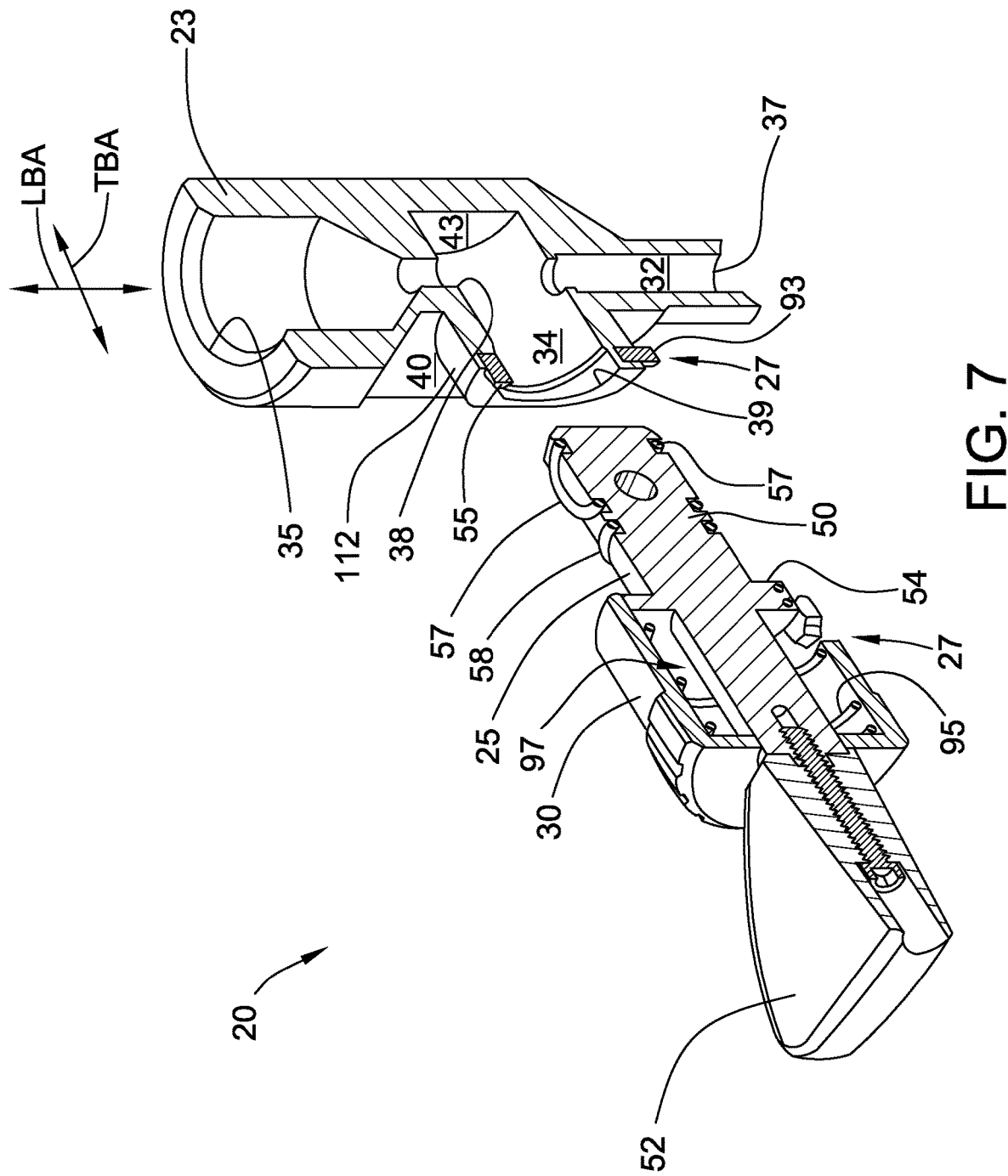
FIG. 7 is a partial exploded view, in perspective, of the valve assembly of FIG. 1 taken from the cross-sectional view of FIG. 6.

Referring to FIGS. 6 and 7, the body 23 is hollow and defines a fluid passage 32 and a valve passage 34. The valve passage 34 is in communication with the fluid passage 32. The fluid passage 32 extends axially along a longitudinal body axis LBA between a first fluid opening 35 and a second fluid opening 37 and includes a cross-bore opening 38 disposed axially between the first and second fluid openings 35, 37. The first fluid opening 35 can be configured to be placed in fluid communication with a fluid sample at the top of the body 23 for introducing fluid into the fluid passage 32 of the body 23. The second fluid opening 37 can be configured to be placed in fluid communication with a manifold at the bottom of the body 23 for discharging fluid from the fluid passage 32 of the body 23.

The valve passage 34 is configured to receive therein at least a portion of the valve member 25. The valve passage 34 is in communication with the fluid passage 32 via the cross-bore opening 38 of the fluid passage 32. In the illustrated embodiment, the valve passage 34 comprises a blind cross bore. The valve passage 34 includes a single port opening 39 through which the valve member 25 can be inserted into the valve passage 34. In the illustrated embodiment, the port opening 39 of the valve passage 34 is located at a front side 40 of the body 23 (see also, FIG. 5). The valve passage 34 extends along a transverse body axis TBA from the port opening 39 to a closed terminal end surface 43 disposed within the body 23.

In embodiments, the valve member 25 is adapted to selectively occlude the fluid passage 32 of the body 23. In embodiments, at least a portion of the valve member 25 is disposed in the valve passage 34 of the body 23, which is a blind cross bore. The valve member 25 is selectively movable over a range of travel between an open position (shown in FIGS. 13-15), in which the axial through passage 32 permits fluid flow therethrough, and a closed position (shown in FIGS. 1-6), in which the valve member 25 occludes the axial through passage 32 of the body 23. When the valve member 25 is in the open position, the first fluid opening 35 and the second fluid opening 37 of the fluid passage 32 of the body 23 are in fluid communication with each other. When the valve member 25 is in the closed position, the valve member 25 occludes the fluid passage 32 to fluidly isolate the first fluid opening 35 and the second fluid opening 37.

Referring to FIGS. 6 and 7, in the illustrated embodiment, the valve member 25 includes a core 50, a knob 52, a mounting flange 54, a stop lug 55, and a plurality of seal members 57, 58. Referring to FIG. 6, in embodiments, at least a portion of the core 50 is disposed within the valve passage 34 of the body 23. The core 50 defines a longitudinal core axis LCA. The core 50 is rotatable about the longitudinal core axis LCA with respect to the body 23 to move the valve member 25 over the range of travel between the open position and the closed position.

Figure 15:
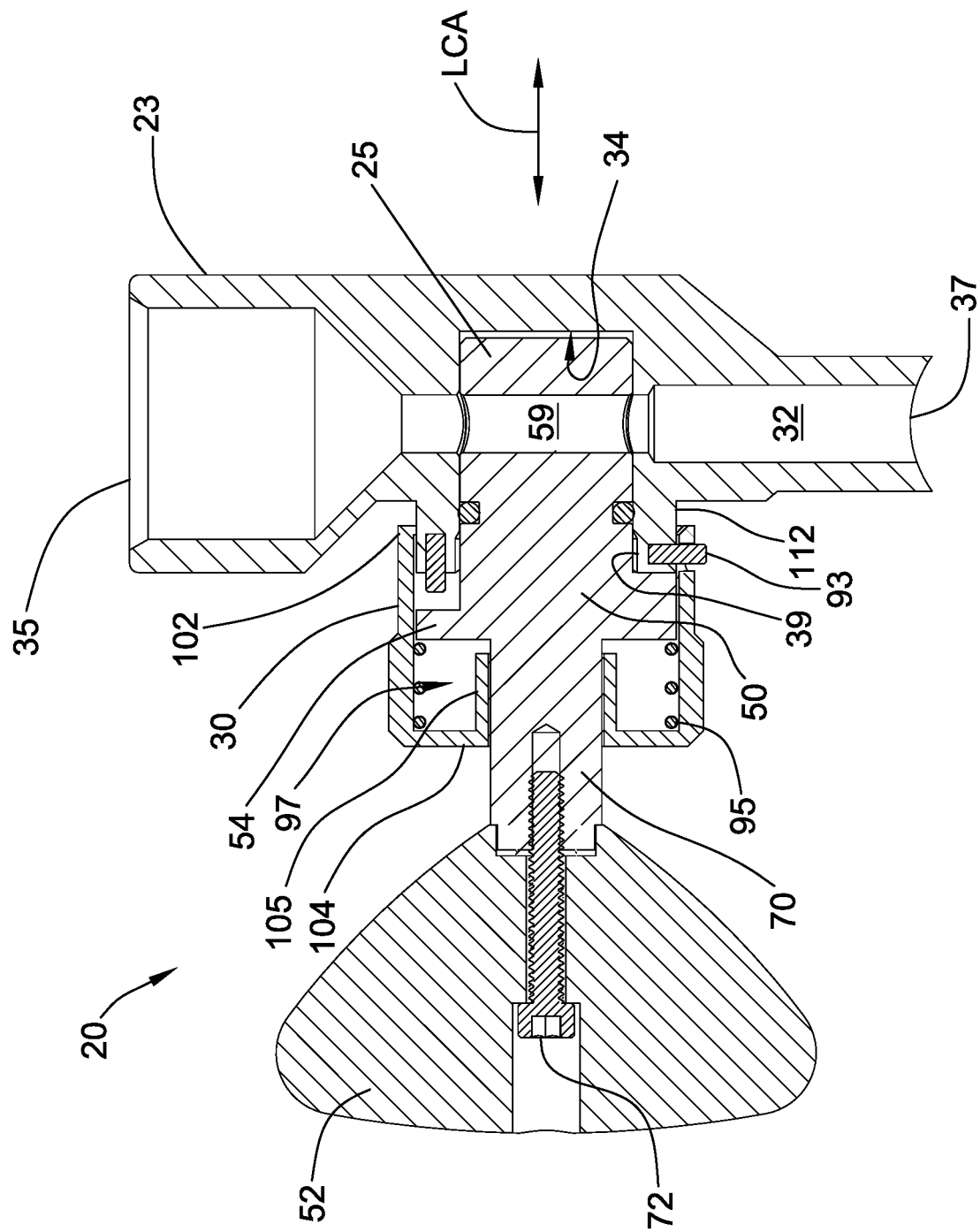
FIG. 15 is a cross-sectional view of the valve assembly of FIG. 1 taken along line XV-XV in FIG. 14.

Referring to FIGS. 6 and 15, in the illustrated embodiment, the core 50 defines a core through passage 59. The core through passage 59 is in communication with the fluid passage 32 of the body 23 when the valve member 25 is in the open position such that the first fluid opening 35 and the second fluid opening 37 of the fluid passage 32 of the body 23 are in fluid communication with each other via the core through passage 59 (as shown in FIG. 15). The core through passage 59 is in fluid isolation from the fluid passage 32 of the body 23 when the valve member 25 is in the closed position (as shown in FIG. 6).

Referring to FIG. 6, the core 50 of the valve member 25 includes a stem 70. In embodiments, at least a portion of the stem 70 extends from the body 23 when the valve member 25 is installed in the valve passage 34 of the body 23. In embodiments, the knob 52 can be connected to the stem 70 of the core 50 by any suitable manner. In the illustrated embodiment, a threaded fastener 72 is used to connect the knob 52 to the stem 70. In embodiments, at least a portion of the knob 52 is disposed in outward relationship to the coupling member 30 when the valve member 25 is installed in the valve passage 34, as shown in FIG. 6. In the illustrated embodiment, as shown in FIGS. 6 and 8, a stem end 74 of the core 50 can include a stem boss 75 which can be configured to fit within a complementary cavity 77 of the knob 52 such that the mating geometries help prevent rotation of the knob 52 relative to the stem 70 about the longitudinal core axis LCA.

Figure 13:
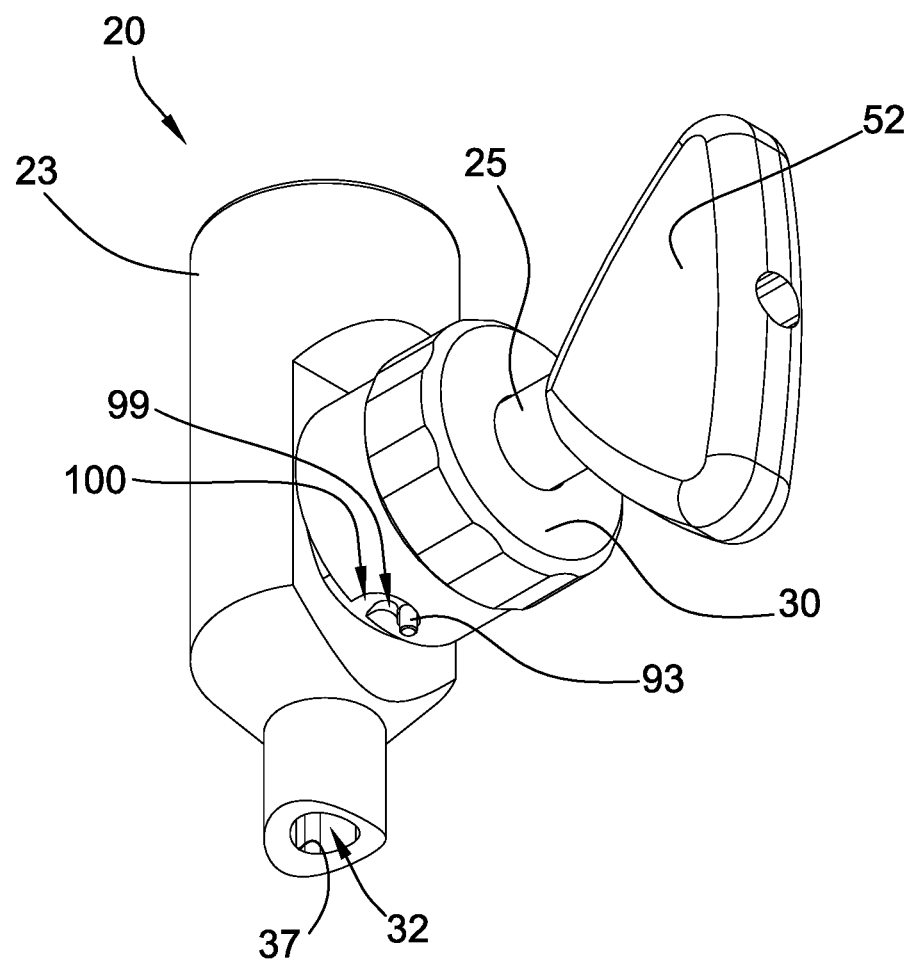
FIG. 13 is a bottom perspective view of the valve assembly of FIG. 1, illustrating the valve assembly in an open position.
Figure 14:
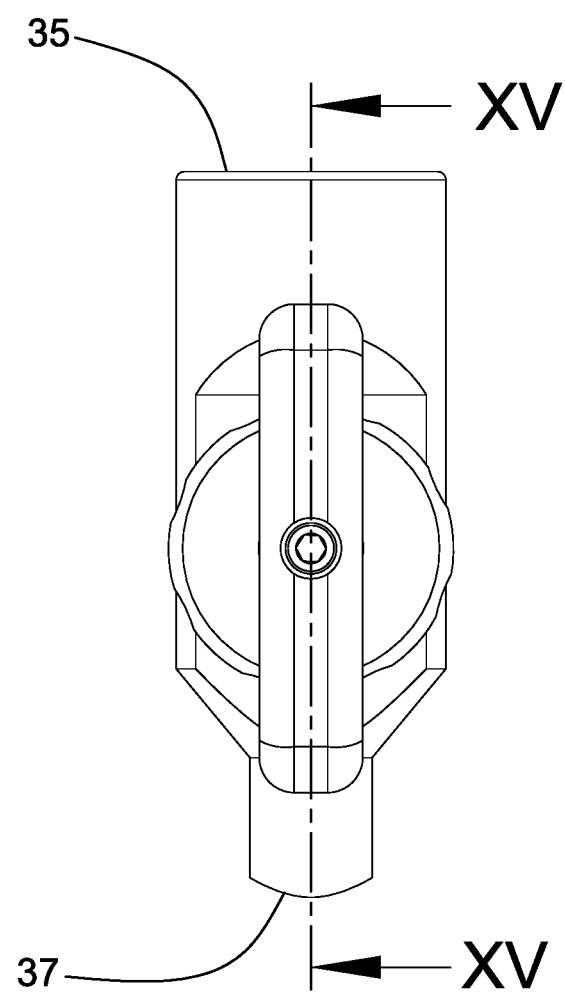
FIG. 14 is a front elevational view of the valve assembly of FIG. 1, illustrating the valve assembly in an open position.

Referring to FIGS. 1 and 13, in embodiments, the knob 52 can be configured such that an operator can readily grasp the knob 52 to selectively rotate the core 50 about the longitudinal core axis LCA to reciprocally move the valve member 25 over the range of travel between the open position and the closed position. The knob 52 can be configured to have an ergonomic shape to facilitate its being grasped by an operator and to reduce slippage or the occurrence of pinch points with or without the operator wearing gloves.

Figure 8:
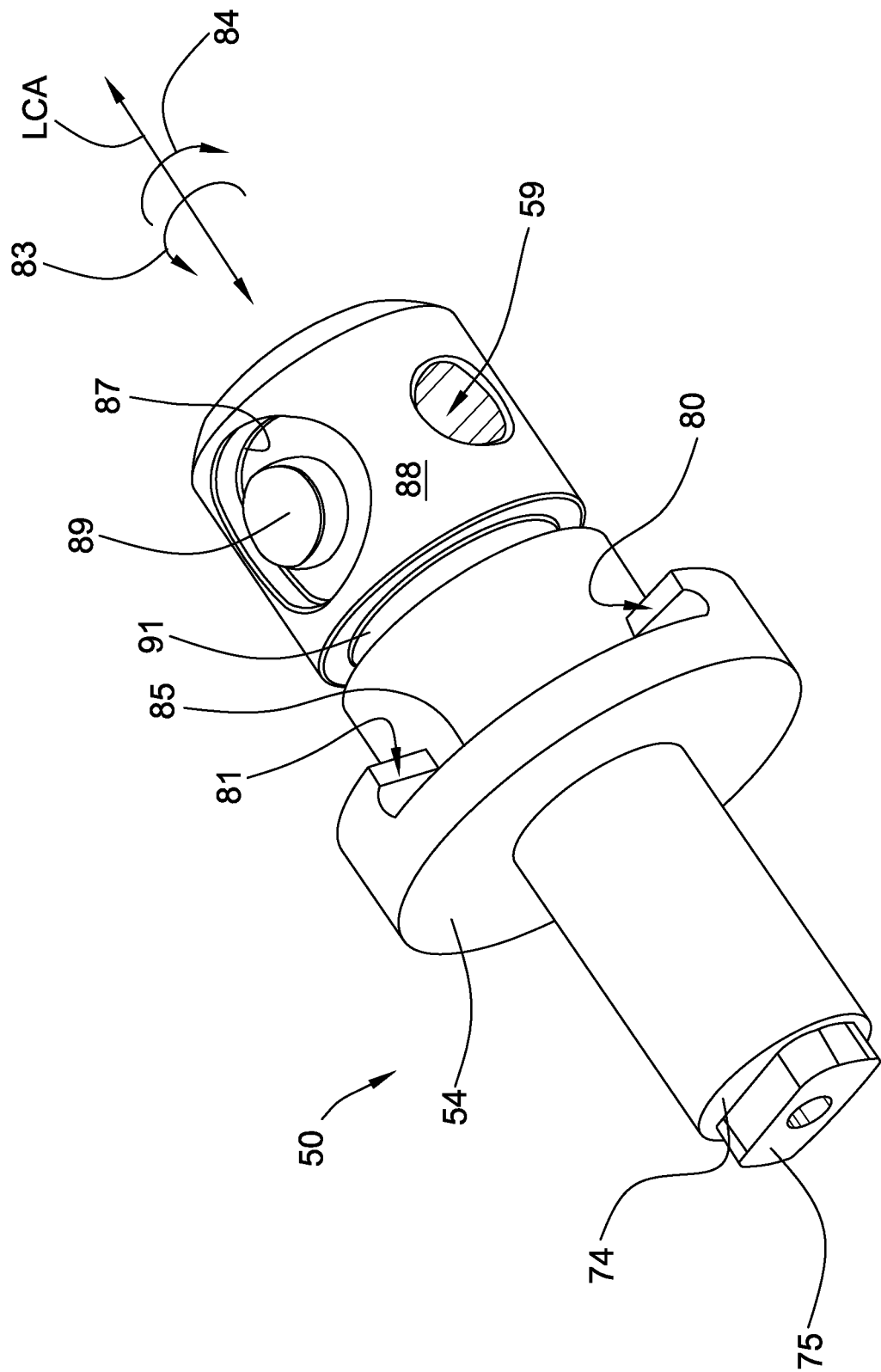
FIG. 8 is a perspective view of a core of the valve assembly of FIG. 1.

Referring to FIGS. 6-8, the mounting flange 54 circumscribes the core 50 and extends radially therefrom. In embodiments, the mounting flange 54 can be configured as a coupling member guide that can act to help align and support the coupling member 30 When it is disposed about the core 50.

Referring to FIGS. 6 and 7, in embodiments, the stop lug 55 can be provided to help an operator position the core 50 in the open and closed positions. In embodiments, the stop lug 55 is connected to one of the body 23 and the core 50 of the valve member 25, and the other of the body 23 and the core 50 includes a first stop surface 80 and a second stop surface 81 (see FIG. 8). In embodiments a pair of stop surfaces 80, 81 can be provided that limit the range of travel of the valve member 25 such that the stop lug 55 engages one of the stop surfaces 80 when the valve member 25 moves from the closed position into the fully open position to limit further movement of the valve member 25 in that direction and such that the stop lug 55 engages the other of the stop surfaces 81 when the valve member 25 moves from the open position into a fully closed position to limit further movement of the valve member 25 in that opposing direction. In the illustrated embodiment, the stop lug 55 is connected to the body 23, and the mounting flange 54 of the core 50 includes the first stop surface 80 and the second stop surface 81 (see FIG. 8).

Referring to FIG. 8, the first stop surface 80 can be adapted to interferingly engage the stop lug 55 when the core 50 is in the open position to prevent the core 50 of the valve member 25 from rotating in a first direction 83 about the longitudinal core axis LCA with respect to the body 23 and to permit the core 50 of the valve to rotate in a second direction 84 about the longitudinal core axis LCA with respect to the body 23. The second direction 84 is in opposing relationship to the first direction 83. The second stop surface 81 is adapted to interferingly engage the stop lug 55 when the core 50 is in the closed position to prevent the core 50 of the valve member 25 from rotating in the second direction 84 about the longitudinal core axis LCA with respect to the body 23 and to permit the core 50 of the valve to rotate in the first direction 83 about the longitudinal core axis LCA with respect to the body 23.

In embodiments, the first and second stop surfaces 80, 81 establish the range of travel over which the core 50 can be rotated about the longitudinal core axis LCA with respect to the body 23, The mounting flange 54 can define a recess 85 or a cut-out limited by the first and second stop surfaces 80, 81. In embodiments, the recess 85 can extend circumferentially over a predetermined arc distance around the mounting flange 54 to define the range of travel over which the valve core 50 is rotatable about the longitudinal core axis LCA in order to conveniently and readily position the through passage 59 of the core 50 in such a way as to allow (or prohibit) the flow of fluid through the fluid passage 32 of the body 23.

Referring to FIGS. 6 and 7, in embodiments, the core 50 can be outfitted with one or more seal members 57, 58 to provide a running seal between the core 50 and the valve passage 34 of the body 23. In the illustrated embodiment, three seal members 57, 58 are provided. A pair of occlusion o-rings 57 can be disposed in opposing relationship to each other in a respective sidewall groove 87 defined in an exterior surface 88 of the core 50 (see also, FIG. 8). A solid plug portion 89 is defined within each interior of the sidewall grooves 87 which comprises a solid portion of the core 50 through which fluid cannot flow. The occlusion o-rings 57 are arranged such that the occlusion o-rings 57 are in sealing engagement with the valve passage 34 to help fluidly isolate the first fluid opening 35 and the second fluid opening 37 of the fluid passage 32 when the valve member 25 is in the closed position, as shown in FIG. 6.

A circumferential o-ring 58 is also disposed within a circumferential groove 91 defined by the exterior surface 88 of the core 50 (see also, FIG. 8). The circumferential o-ring 58 helps provide a running seal between the core 50 and the valve passage 34 to help prevent fluid from leaking out through the valve passage 34 when the valve member 25 is in the open position (as shown in FIG. 15) and fluid is flowing from the first fluid opening 35 to the second fluid opening 37 of the fluid passage 32.

Referring to FIGS. 6 and 7, the coupling assembly 27 is adapted to removably mount the valve member 25 to the body 23. The illustrated coupling assembly 27 includes a coupling member 30, a retention lug 93, and a biasing member 95.

The coupling member 30 is removably mounted to the body 23. The coupling member 30 defines an internal cavity 97. At least a portion of the valve member 25 is disposed within the internal cavity 97 of the coupling member 30.

Figure 4:
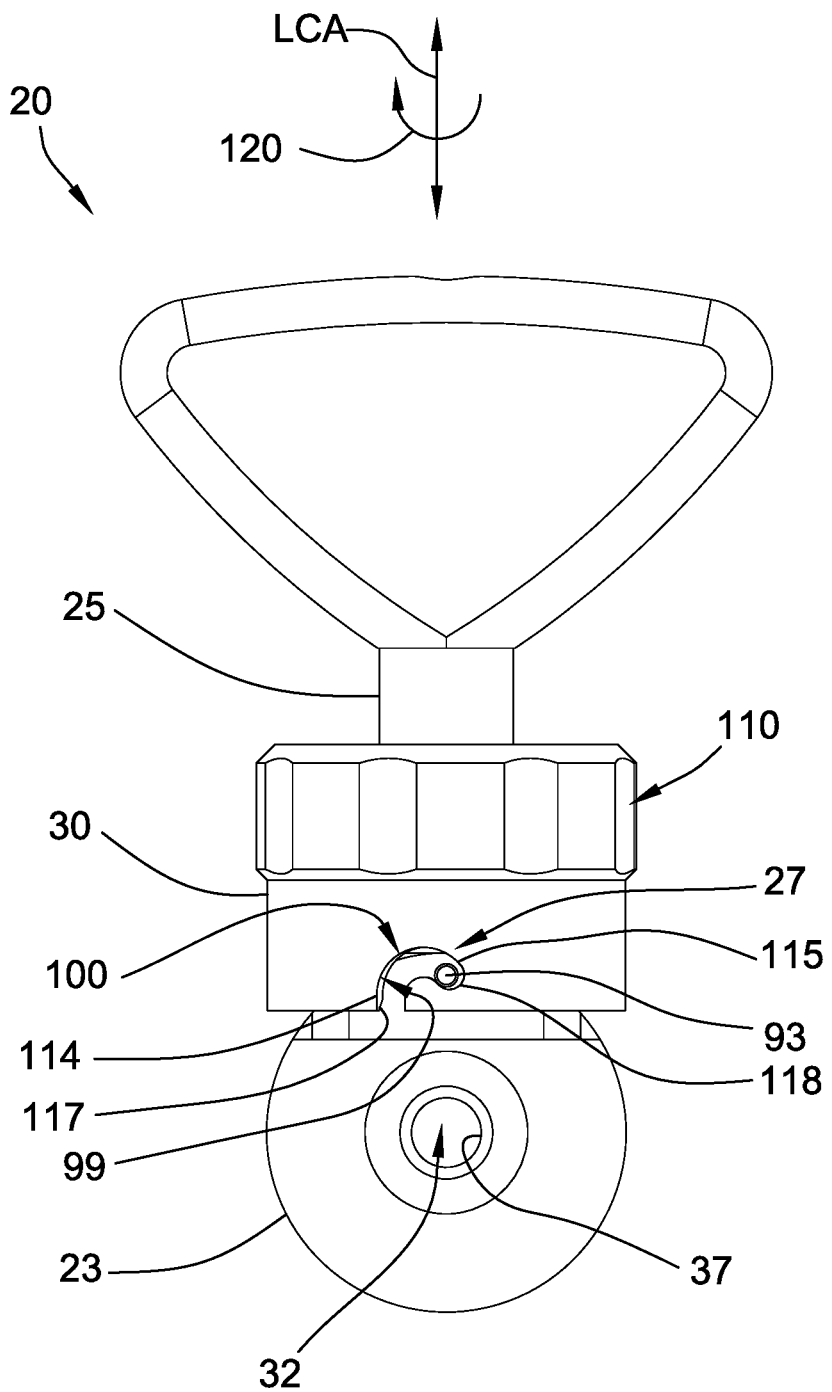
FIG. 4 is a bottom plan view of the valve assembly of FIG. 1.
Figure 5:
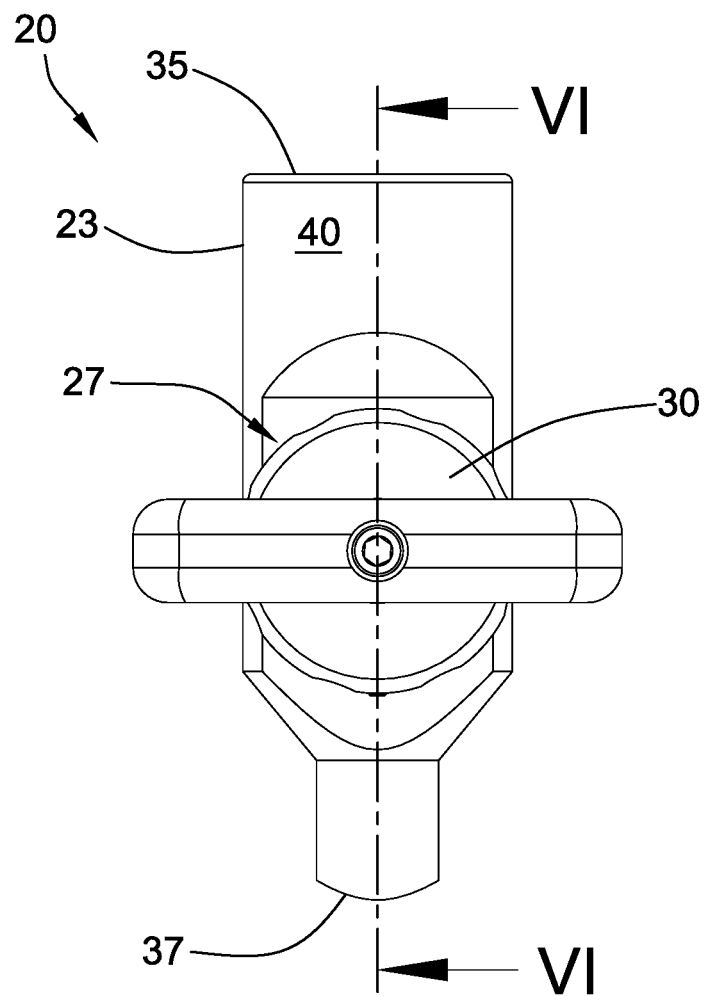
FIG. 5 is a front elevational view of the valve assembly of FIG. 1.

Referring to FIGS. 4 and 13, in embodiments, the retention lug 93 is connected to one of the body 23 and the coupling member 30, and the other of the body 23 and the coupling member 30 includes a retention surface 99 that defines a lug raceway 100. The lug raceway 100 is configured to removably receive the retention lug 93 therein such that the retention lug 93 and the retention surface 99 are in interfering relationship with each other to removably mount the coupling member 30 to the body 23 with the valve member 25 being movably retained therebetween. In the illustrated embodiment, the coupling member 30 includes the retention surface 99 that defines the lug raceway 100, and the retention lug 93 is connected to the body 23. In the illustrated embodiment, the lug raceway 100 is in the form of a slot. In other embodiments, the lug raceway 100 can have a different configuration (such as a groove, for example).

Referring to FIGS. 9-12, the coupling member 30 is in the form of a lock collar that is generally cylindrical. The coupling member 30 includes a body end 102 that is open and a stem end 104 that has an inwardly projecting cylindrical boss 105. An opening 107 of the cylindrical boss 105 can be configured to closely conform to the stem 70 of the core 50. An exterior surface 108 of the lock collar 30 includes a contoured gripping surface 110 adjacent the stem end 104 of the lock collar 30. The gripping surface 110 can be configured to facilitate an operator's use of the lock collar 30 to removably mount the valve member 25 to the body 23.

Referring to FIG. 15, the cylindrical boss 105 of the coupling member 30 can act as a core insertion guide when the coupling member 30 is positioned around the core 50. The cylindrical boss 105 can help stabilize the stem 70 of the core 50, which extends through the cylindrical boss 105. For assembly, the stem 70 of the core 50 can be inserted into the cylindrical boss 105 from the body end 102 of the coupling member 30 such that the stem 70 extends outwardly from the stem end 104, and then the knob 52 can be attached to the stem 70 via the threaded fastener 72.

The body end 102 of the coupling member 30 is configured to fit around a stub projection 112 of the body 23 (see also, FIG. 7) that defines the port opening 39 of the valve passage 34 of the body 23 to help prevent the ingress of external contaminants into the body 23 via the valve passage 34. The arrangement of the body end 102 of the coupling member 30 with the stub projection 112 of the body 23 can further help support the coupling member 30 in place when it is mounted to the body 23.

Figure 10:
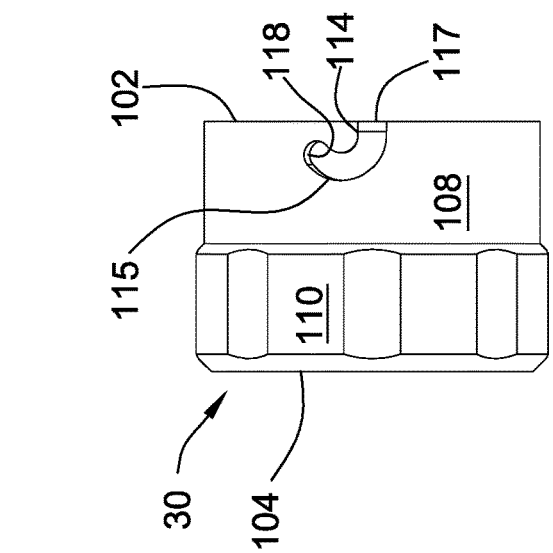
FIG. 10 is a bottom plan view of the coupling member of FIG. 9.
Figure 9:
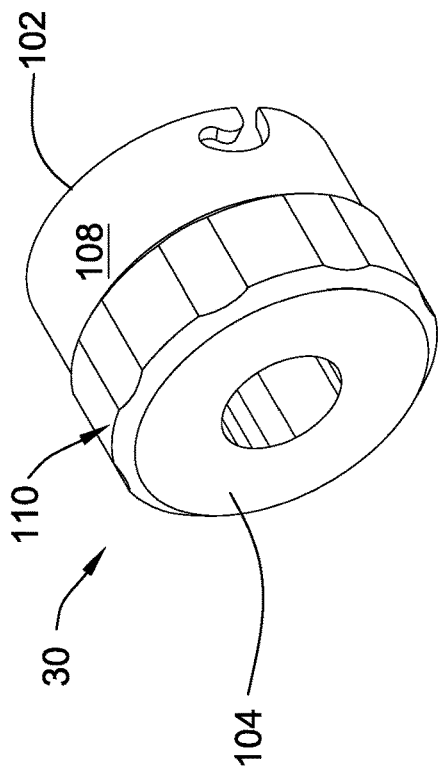
FIG. 9 is a perspective view of a coupling member of the valve assembly of FIG. 1.
Figure 11:
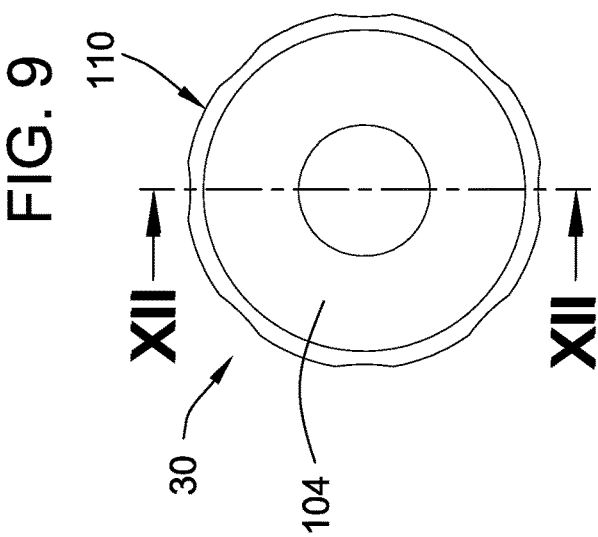
FIG. 11 is a front elevational view of the coupling member of FIG. 9.
Figure 12:
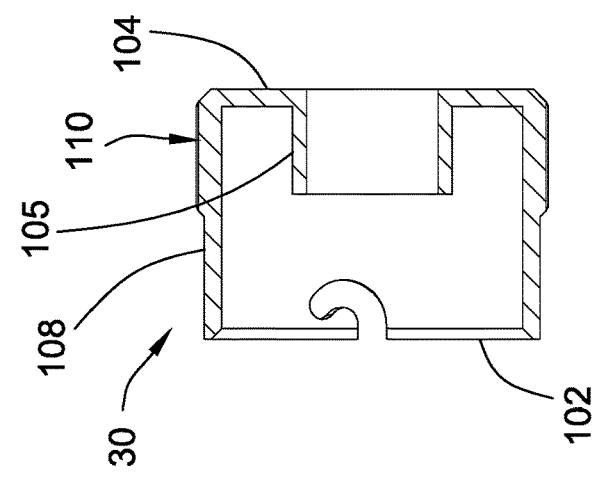
FIG. 12 is a cross-sectional view of the coupling member of FIG. 9 taken along line XII-XII in FIG. 11.

Referring to FIG. 10, in embodiments, the lug raceway 100 includes a first portion 114 extending in a first direction and a second portion 115 extending at an angle with respect to the first portion 114. In the illustrated embodiment, the first portion 114 of the lug raceway 100 extends axially along the coupling member 30, and the second portion 115 of the lug raceway 100 extends transversely to the first portion 114. In the illustrated embodiment, the first portion 114 includes an opening 117, and the second portion 115 includes a closed terminal surface 118. In the illustrated embodiment, the second portion 115 of the lug raceway 100 is arcuate-shaped. The coupling member 30 is removably mounted to the body 23 when the retention lug 93 is positioned in the second portion 115 of the lug raceway 100 (see also, FIG. 4).

Referring to FIG. 4, the gripping surface 110 can facilitate the operator's installation of the coupling member 30 by allowing an operator to grab the gripping surface 110 and rotate/translate the coupling member 30 as it is mounted to the body 23. An operator can grasp the gripping surface 110 to help manipulate the lock collar 30 as it is moved axially along the longitudinal core axis LCA with respect to the retention lug 93 such that the retention lug 93 moves within the first portion 114 of the lug raceway 100 from the opening 117 toward the second portion 115 of the lug raceway 100. When the retention lug 93 is aligned with the second portion 115 of the lug raceway 100, the operator can rotate the lock collar 30 about the longitudinal core axis LCA in a locking direction 120 with respect to the retention lug 93 such that the retention lug 93 moves within the second portion 115 of the lug raceway 100 from the first portion 114 toward the closed terminal surface 118 of the second portion.

Referring to FIG. 15, the biasing member 95 can be provided to help retain the coupling member 30 in a mounted position with respect to the body 23. The biasing member 95 can be in the form of a spring that can be placed around the valve core 50. The biasing member 95 can be disposed axially between the coupling member 30 and the mounting flange 54 of the core 50. The mounting flange 54 can act as a seat for the biasing member 95.

The biasing member 95 can act against the lock collar 30 to help maintain the retention lug 93 in position adjacent the closed terminal surface 118 of the second portion 115 of the lug raceway 100. In embodiments, the biasing member 95 and at least the mounting flange 54 of the valve member 25 are disposed within the internal cavity 97 of the coupling member 30. The biasing member 95 is interposed between the mounting flange 54 of the valve member 25 and the coupling member 30 when the coupling member 30 is removably mounted to the body 23 such that the biasing member 95 exerts an opposing force against the mounting flange 54 of the valve member 25 and against the coupling member 30.

The interengagement of the coupling member 30 and the retention lug 93 helps limit the size of the open space within the internal cavity 97 of the coupling member 30 each that the biasing member 95 is compressed. The biasing member 95 in turn exerts an opposing spring force against both the mounting flange 54 and the coupling member 30. The spring force generated within the spring 95 by its being compressed between the stem end 104 of the coupling member 30 and the mounting flange 54 of the core 50 can urge the coupling member 30 axially away from the mounting flange 54 and the body 23 and urge the core 50 toward the body 23. These biasing forces help urge the retention lug 93 and the retention surface 99 into interfering relationship with each other to prevent the coupling member 30 from moving away axially along the longitudinal core axis LCA with respect to the core 50.

Referring to FIG. 7, in embodiments, the core 50, the knob 52, the seal members 57, 58, the biasing member 95, and the coupling member 30 can be assembled together to form a valve core unit. The valve core unit can be removably attached to the body 23 via the coupling member 30. The valve core unit is readily attached to, and removed from, the body 23 via the front port opening 39 to the valve passage 34 in the body 23. The valve core unit can be readily replaced with another valve core unit having a construction following principles of the present disclosure. The coupling member 30, which can be in the form of the illustrated lock collar 30, can be used to removably mount the valve core unit to the body 23 in such a way that an operator can verify from the front side 40 of the body 23 whether the valve core unit is properly installed for testing. Furthermore, the arrangement of the seal members 57, 58 in relationship to the interaction of the stop lug 55 with the first and second stop surfaces 80, 81 (see also, FIG. 8) can help reduce the risk of microorganism biofilms buildup which could impair testing results.

Figure 16:
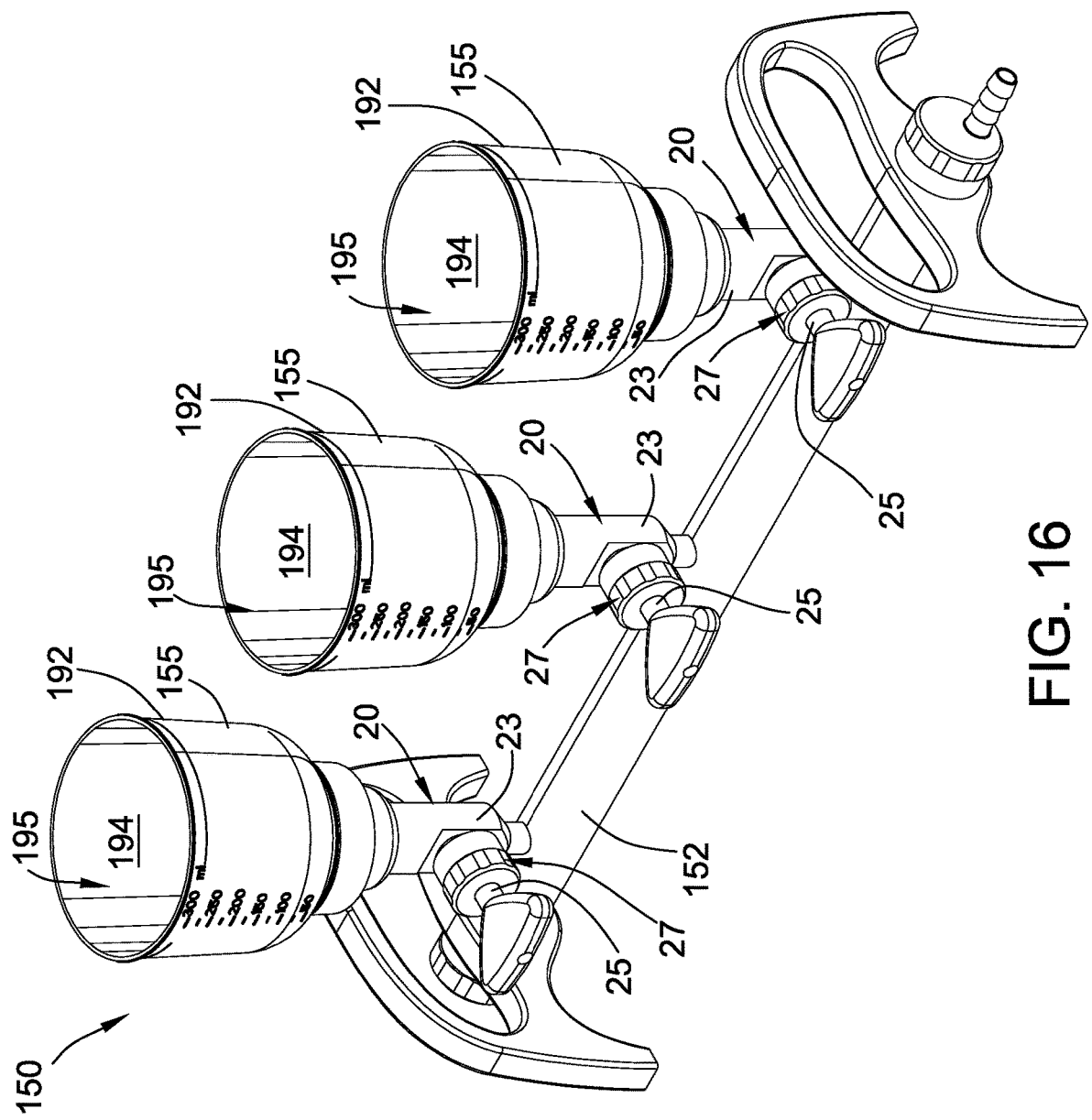
FIG. 16 is a perspective view of an embodiment of a manifold assembly constructed in accordance with principles of the present disclosure
Figure 17:
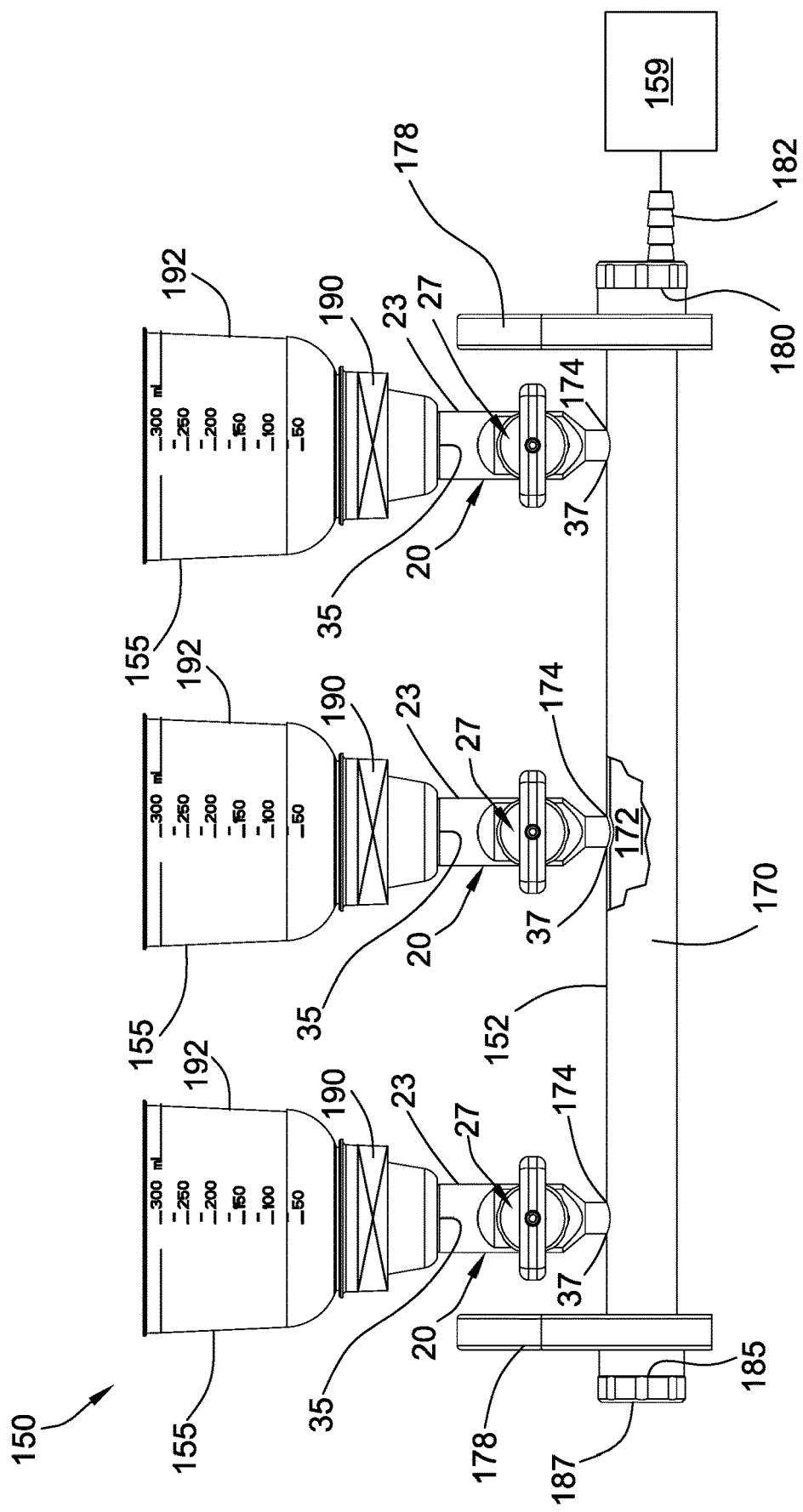
FIG. 17 is a front elevational view of the manifold assembly of FIG. 16.

Referring to FIGS. 16 and 17, an embodiment of a manifold assembly 150 constructed in accordance with principles of the present disclosure is shown. The manifold assembly 150 is adapted to be used for processing a fluid sample. The illustrated manifold assembly 150 includes a manifold 152; a plurality of valve assemblies 20, each having a body 23, a valve member 25, and a coupling assembly 27 as shown and described in FIGS. 1-15; an associated number of filter devices 155, and a pressure source 159 (see FIG. 17). In other embodiments, the manifold assembly 150 can include any other valve assembly constructed in accordance with principles of the present disclosure. In embodiments, the manifold assembly 150 can include at least one filter device 155 (e.g., a filter funnel). In the illustrated embodiment, each valve assembly 20 includes an associated filter device 155.

Referring to FIG. 17, the manifold 152 includes a manifold housing 170, which is hollow and defines a main manifold passage 172 and at least one manifold inlet port 174. Each manifold inlet port 174 is in fluid communication with the main manifold passage 172. The illustrated manifold 152 comprises a three-place manifold which includes three manifold inlet ports 174. In other embodiments, the number of manifold inlet ports 174 can vary (e.g., a six-place manifold or nine-place manifold). The manifold 152 can also include a pair of end supports 178 that connected to the manifold housing 170 and configured to support the manifold housing 170 in an elevated position.

The manifold housing 170 defines a main manifold passage outlet 180 which is in fluid communication with the main manifold passage 172. In the illustrated embodiment, the main manifold passage outlet 180 is equipped with a barbed connector 182 to facilitate the connection of the pressure source 159 to the manifold 152. The manifold housing 170 can also include a connection port 185, which is in fluid communication with the main manifold passage 172 and in opposing relationship to the main manifold passage outlet 180. The connection port 185 is configured to facilitate the series connection of another manifold to the same pressure source 159. In the illustrated embodiment, an end cap 187 is arranged to occlude the connection port 185. For a series connection with another manifold, the end cap 187 can be removed and the other manifold can be placed in fluid communication with the manifold 152 of FIG. 17 via a suitable connector such that the pressure source 159 can be operated to generate a pressure within both of the connected manifolds. Alternately, the end cap 187 and the barbed connector 182 can be switched with each other to change the location of the main manifold passage outlet 180 and the connection port 185 to the other sides of the manifold 152.

With respect to each valve assembly 20, the body 23 is connected to one of the manifold inlet ports 174 of the manifold housing 152 using any suitable technique (such as, by welding, for example). The second fluid opening 37 of each body 23 is in fluid communication with the main manifold passage 172. Each valve assembly 20 can serve as a holder for an associated filter device 150 and can selectively provide a fluid path for membrane filtration of liquids through a porous filter medium 190 disposed within the filter device 150 to recover microorganisms within the liquid.

In the illustrated embodiment, each filter funnel 155 is substantially identical. The filter funnels 155 each include a porous filter medium 190 (such as, a hydrophilic membrane, for example) and a funnel portion 192. The funnel portion 192 has an interior surface 194 that defines a reservoir 195 (see also, FIG. 16). The reservoir 195 is in fluid communication with the first fluid opening 35 of the fluid passage 32 of the associated body 23 via the porous filter medium 190.

In embodiments, the pressure source 159 can be coupled to the main manifold passage outlet 180 for creating a pressure within the main manifold passage 172. In embodiments, the pressure source 159 can comprise a vacuum source configured to generate a negative pressure within the main manifold passage 172. The vacuum source 159 can be placed in fluid communication with the main manifold passage outlet 180 of the manifold 150. The vacuum source 159 can be adapted to selectively generate a vacuum within the main manifold passage 172 of the manifold 150. The filtrated fluid can be discharged from the main manifold passage outlet 180 out through the vacuum source 159.

For filtration, a filter device 155 can be mounted to at least one of the valve assemblies 20 mounted to the manifold 150. The reservoir 195 of the funnel portion 192 of the filter device 155 can be filled with a sample fluid. The vacuum source 159 can be turned on to generate a vacuum within the main manifold passage 172 of the manifold 150. Then the valve member 25 of the valve assembly 20 can be moved from the closed position to the open position. Sample fluid can flow from the reservoir 195 through the porous filter medium 190, the first fluid opening 35 of the fluid passage 32 of the body 23, and the core through passage 59, and then be discharged from the second fluid opening 37 of the body 23 out into the main manifold passage 172. The vacuum source 159 can draw the filtrated fluid from the main manifold passage 172 out of the main manifold passage outlet 180. When concluding filtration, the valve member 25 can be placed in the closed position, and then the vacuum source 159 can be turned off.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A valve assembly for a manifold, the valve assembly comprising:
   a body, the body defining a fluid passage and a valve passage, the fluid passage extending axially between a first fluid opening and a second fluid opening and including a cross-bore opening disposed axially between the first and second fluid openings, and the valve passage being in communication with the fluid passage via the cross-bore opening of the fluid passage, the body including a stub projection defining the cross-bore opening;
   a valve member, at least a portion of the valve member being disposed in the valve passage of the body, the valve member being selectively movable over a range of travel between an open position, in which the first fluid opening and the second fluid opening of the fluid passage of the body are in fluid communication with each other, and a closed position, in which the valve member occludes the fluid passage to fluidly isolate the first fluid opening and the second fluid opening, the valve member including a core and a mounting flange, at least a portion of the core being disposed within the valve passage of the body, the core defining a longitudinal axis, the core being rotatable about the longitudinal axis with respect to the body to move the valve member over the range of travel between the open position and the closed position, the core including an exterior surface, the exterior surface defining a circumferential groove and a circular sidewall groove with a solid plug portion therewithin, the mounting flange circumscribing the core and extending radially therefrom, and the mounting flange including a first stop surface and a second stop surface;

a coupling assembly, the coupling assembly adapted to removably mount the valve member to the body, the coupling assembly including a coupling member, a retention lug, and a biasing member, the coupling member defining an internal cavity, at least a portion of the valve member being disposed within the internal cavity of the coupling member, the retention lug being connected to one of the body and the coupling member, and the other of the body and the coupling member including a retention surface, the retention surface defining a lug raceway, the lug raceway being configured to removably receive the retention lug therein such that the retention lug and the retention surface are in interfering relationship with each other to removably mount the coupling member to the body with the valve member being movably retained therebetween, the biasing member interposed between the mounting flange of the valve member and the coupling member when the coupling member is removably mounted to the body such that the biasing member exerts an opposing force against the mounting flange of the valve member to urge the mounting flange into interfering relationship with the stub projection and against the coupling member to urge the retention lug and the retention surface into interfering relationship with each other;

a circumferential seal member, the circumferential seal member mounted to the core of the valve member and disposed within the circumferential groove of the core such that the circumferential seal member is interposed between the core and the body to provide a running seal between the core and the valve passage of the body;

an occlusion seal member, the occlusion seal member mounted to the core of the valve member and disposed within the circular sidewall groove of the core such that the occlusion seal member is in sealing engagement with the valve passage to fluidly isolate the first fluid opening from the second fluid opening when the valve member is in the closed position;

a stop lug, the stop lug being connected to the body;

wherein the first stop surface of the mounting flange of the valve member is adapted to interferingly engage the stop lug when the core of the valve member is in the open position to prevent the core from rotating in a first direction about the longitudinal axis with respect to the body and to permit the core to rotate in a second direction about the longitudinal axis with respect to the body, the second direction being in opposing relationship to the first direction, and wherein the second stop surface of the mounting flange of the valve member is adapted to interferingly engage the stop lug when the core of the valve member is in the closed position to prevent the core from rotating in the second direction about the longitudinal axis with respect to the body and to permit the core to rotate in the first direction about the longitudinal axis with respect to the body.

2. The valve assembly according to claim 1, wherein the valve passage comprises a blind cross bore.

3. The valve assembly according to claim 1, wherein the lug raceway includes a first portion extending in a first direction and a second portion extending at an angle with respect to the first portion, the first portion including an opening, and the second portion including a closed terminal surface, and wherein the coupling member is removably mounted to the body when the retention lug is positioned in the second portion of the lug raceway.

4. The valve assembly according to claim 3, wherein the coupling member includes the retention surface, the first portion of the lug raceway extends axially along the coupling member, and the second portion of the lug raceway extends transversely to the first portion.

5. The valve assembly according to claim 4, wherein the second portion of the lug raceway is arcuate-shaped.

6. The valve assembly according to claim 1, wherein the core defines a core through passage, the core through passage being in communication with the fluid passage of the body when the valve member is in the open position such that the first fluid opening and the second fluid opening of the fluid passage of the body are in fluid communication with each other via the core through passage, and the core through passage being in fluid isolation from the fluid passage of the body when the valve member is in the closed position.

7. The valve assembly according to claim 6, wherein the valve member includes a knob, the core of the valve member including a stem, at least a portion of the stem extending from the body, the knob being connected to the stem of the core, and at least a portion of the knob disposed in outward relationship to the coupling member.

8. A manifold assembly for processing a fluid sample, the manifold assembly comprising:

a manifold, the manifold including a manifold housing defining a main manifold passage, at least one manifold inlet port in fluid communication with the main manifold passage, and a main manifold passage outlet in fluid communication with the main manifold passage, each of said at least one manifold inlet port comprising a cross-bore opening into the main manifold passage relative to the main manifold passage outlet;

a body, the body connected to one of said at least one manifold inlet port of the manifold housing, the body defining a fluid passage and a valve passage, the fluid passage extending axially between a first fluid opening and a second fluid opening and including a cross-bore opening disposed axially between the first and second fluid openings, the second fluid opening being in fluid communication with the main manifold passage, and the valve passage being in communication with the fluid passage via the cross-bore opening of the fluid passage, the body including a stub projection defining the cross-bore opening;

a valve member, at least a portion of the valve member being disposed in the valve passage of the body, the valve member being selectively movable over a range of travel between an open position, in which the first fluid opening and the second fluid opening of the fluid passage of the body are in fluid communication with each other, and a closed position, in which the valve member occludes the fluid passage to fluidly isolate the first fluid opening and the second fluid opening, the valve member including a core and a mounting flange, at least a portion of the core being disposed within the valve passage of the body, the core defining a longitudinal axis, the core being rotatable about the longitudinal axis with respect to the body to move the valve member over the range of travel between the open position and the closed position, the core including an exterior surface, the exterior surface defining a circumferential groove and a circular sidewall groove with a solid plug portion therewithin, the mounting flange circumscribing the core and extending radially therefrom, and the mounting flange including a first stop surface and a second stop surface;

a coupling assembly, the coupling assembly adapted to removably mount the valve member to the body, the coupling assembly including a coupling member, a retention lug, and a biasing member, the coupling member defining an internal cavity, at least a portion of the valve member being disposed within the internal cavity of the coupling member, the retention lug being connected to one of the body and the coupling member, and the other of the body and the coupling member including a retention surface, the retention surface defining a lug raceway, the lug raceway being configured to removably receive the retention lug therein such that the retention lug and the retention surface are in interfering relationship with each other to removably mount the coupling member to the body with the valve member being movably retained therebetween, the biasing member interposed between the mounting flange of the valve member and the coupling member when the coupling member is removably mounted to the body such that the biasing member exerts an opposing force against the mounting flange of the valve member to urge the mounting flange into interfering relationship with the stub projection and against the coupling member to urge the retention lug and the retention surface into interfering relationship with each other;

a circumferential seal member, the circumferential seal member mounted to the core of the valve member and disposed within the circumferential groove of the core such that the circumferential seal member is interposed between the core and the body to provide a running seal between the core and the valve passage of the body;

an occlusion seal member, the occlusion seal member mounted to the core of the valve member and disposed within the circular sidewall groove of the core such that the occlusion seal member is in sealing engagement with the valve passage to fluidly isolate the first fluid opening from the second fluid opening when the valve member is in the closed position;

a stop lug, the stop lug being connected to the body;

wherein the first stop surface of the mounting flange of the valve member is adapted to interferingly engage the stop lug when the core of the valve member is in the open position to prevent the core from rotating in a first direction about the longitudinal axis with respect to the body and to permit the core to rotate in a second direction about the longitudinal axis with respect to the body, the second direction being in opposing relationship to the first direction, and wherein the second stop surface of the mounting flange of the valve member is adapted to interferingly engage the stop lug when the core of the valve member is in the closed position to prevent the core from rotating in the second direction about the longitudinal axis with respect to the body and to permit the core to rotate in the first direction about the longitudinal axis with respect to the body.

9. The manifold assembly according to claim 8, further comprising:
a filter device, the filter device associated with the body, the filter device including a porous filter medium and a funnel portion, the funnel portion having an interior surface defining a reservoir, the reservoir in fluid communication with the first fluid opening of the fluid passage of the body via the filter medium.

10. The manifold assembly according to claim 8, further comprising:
a vacuum pump, the vacuum pump in fluid communication with the main manifold passage outlet of the manifold, the vacuum pump adapted to selectively generate a vacuum within the main manifold passage of the manifold.

11. The manifold assembly according to claim 8, wherein the valve passage of the body comprises a blind cross bore.

12. The manifold assembly according to claim 8, wherein the lug raceway of the coupling assembly includes a first portion extending in a first direction and a second portion extending at an angle with respect to the first portion, the first portion including an opening, and the second portion including a closed terminal surface, and wherein the coupling member is removably mounted to the body when the retention lug is positioned in the second portion of the lug raceway.

13. The manifold assembly according to claim 8, wherein the core defines a core through passage, the core through passage being in communication with the fluid passage of the body when the valve member is in the open position such that the first fluid opening and the second fluid opening of the fluid passage of the body are in fluid communication with each other via the core through passage of the core, and the core through passage of the core being in fluid isolation from the fluid passage of the body when the valve member is in the closed position.

14. The manifold assembly according to claim 8, wherein the manifold comprises a three-place manifold, the manifold housing defining three manifold inlet ports each in fluid communication with the main manifold passage.

* * * * *